United States Patent
Ein-Gal et al.

(10) Patent No.: US 9,928,048 B2
(45) Date of Patent: *Mar. 27, 2018

(54) SYSTEM AND METHOD FOR PROVIDING APPLICATION PROGRAMS TO DEVICES

(71) Applicant: Digital Turbine, Inc., Austin, TX (US)

(72) Inventors: Oren Ein-Gal, Herzlia Pituach (IL); Vincent Vu, Los Angeles, CA (US); Dekel Boni, Holon (IL)

(73) Assignee: Digital Turbine, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/451,428

(22) Filed: Aug. 4, 2014

(65) Prior Publication Data

US 2014/0344804 A1 Nov. 20, 2014

Related U.S. Application Data

(63) Continuation-in-part of application No. 13/841,140, filed on Mar. 15, 2013.

(60) Provisional application No. 61/738,992, filed on Dec. 18, 2012.

(51) Int. Cl.
G06F 9/445 (2006.01)
H04L 29/08 (2006.01)

(52) U.S. Cl.
CPC ............... *G06F 8/61* (2013.01); *H04L 67/10* (2013.01)

(58) Field of Classification Search
USPC ....................................................... 717/178
See application file for complete search history.

(56) References Cited

U.S. PATENT DOCUMENTS

| | | | |
|---|---|---|---|
| 6,138,009 | A | 10/2000 | Birgerson |
| 6,622,017 | B1 | 9/2003 | Hoffman |
| 6,941,453 | B2 | 9/2005 | Rao |
| 6,976,253 | B1 | 12/2005 | Wierman et al. |
| 7,054,900 | B1 | 5/2006 | Goldston |

(Continued)

FOREIGN PATENT DOCUMENTS

WO WO 2014/100287 6/2014

OTHER PUBLICATIONS

International Search Report and Written Opinion in PCT/US13/76306, International Searching Authority, Alexandria, VA, dated May 20, 2014.

(Continued)

*Primary Examiner* — Hang Pan

(57) ABSTRACT

A system and method are provided for installing applications on a mobile device at first device initialization. An installation client communicates with a management server at an initial start-up state of a mobile device. The management server identifies a set of applications that are available for installation on the client device, and provides the installation files to the device. The management server selects certain client devices for certain applications based on user segments, allowing customization of applications according to user data. This initialization-installation of application programs allows the user to have the experience of having access to pre-installed applications at device initialization, while allowing application providers and mobile network operators real-time management of application programs being offered, without requiring pre-installing a bundle of applications on a device prior to device distribution.

16 Claims, 7 Drawing Sheets

(56) References Cited

U.S. PATENT DOCUMENTS

| | | |
|---|---|---|
| 7,184,759 B2 | 2/2007 | Date et al. |
| 7,555,750 B1 | 6/2009 | Lilley |
| 7,583,960 B2 | 9/2009 | Wierman et al. |
| 7,657,884 B2 | 2/2010 | Okonnen et al. |
| 7,698,302 B2 | 4/2010 | Wendelrup |
| 7,739,486 B2 | 6/2010 | Rao |
| 7,756,880 B2 | 7/2010 | Sighart et al. |
| 7,904,895 B1 | 3/2011 | Cassapakis et al. |
| 7,958,118 B2 | 6/2011 | Eggink et al. |
| 8,046,753 B1 | 10/2011 | Qumei |
| 8,073,937 B2 | 12/2011 | Martinent et al. |
| 8,095,153 B2 | 1/2012 | Jenkins et al. |
| 8,180,688 B1 | 5/2012 | Velummylum et al. |
| 8,185,096 B2 | 5/2012 | Smith et al. |
| 8,213,921 B2 | 7/2012 | Chen et al. |
| 8,214,471 B2 | 7/2012 | Doshi et al. |
| 8,225,082 B2 | 7/2012 | Hans et al. |
| 8,233,893 B2 | 7/2012 | Chen |
| 8,250,566 B2 | 8/2012 | Zusman |
| 8,340,796 B2 | 12/2012 | Stefik |
| 8,364,137 B2 | 1/2013 | Chen et al. |
| 8,365,162 B2 | 1/2013 | Rauma |
| 8,392,282 B2 | 3/2013 | Nagasaka et al. |
| 8,417,263 B2 | 4/2013 | Jenkins et al. |
| 8,463,884 B2 | 6/2013 | Clinton et al. |
| 8,484,633 B2 | 7/2013 | Kim |
| 8,515,409 B2 | 8/2013 | Ramo et al. |
| 8,527,613 B2 | 9/2013 | Malone et al. |
| 8,539,359 B2 | 9/2013 | Rapaport et al. |
| 8,539,471 B2 | 9/2013 | Morton |
| 8,548,876 B1 | 10/2013 | Fox et al. |
| 8,555,273 B1 | 10/2013 | Chia et al. |
| 8,560,486 B2 | 10/2013 | Leo et al. |
| 8,577,398 B2 | 11/2013 | Dudley et al. |
| 8,612,967 B1 | 12/2013 | Delker |
| 8,666,525 B1 | 3/2014 | Stefik |
| 8,688,699 B2 | 4/2014 | Eggink et al. |
| 8,688,805 B2 | 4/2014 | Swanburg et al. |
| 8,694,666 B2 | 4/2014 | Dixon |
| 8,707,288 B2 | 4/2014 | Roseborough |
| 8,725,180 B2 | 5/2014 | Lee et al. |
| 8,745,613 B2 | 6/2014 | Bambach et al. |
| 8,762,521 B2 | 6/2014 | Cudd et al. |
| 8,793,031 B2 | 7/2014 | Anantha et al. |
| 2003/0028884 A1 | 2/2003 | Swart et al. |
| 2004/0224674 A1 | 11/2004 | O'Farrell et al. |
| 2006/0031529 A1 | 2/2006 | Keith, Jr. |
| 2006/0080261 A1 | 4/2006 | Christal |
| 2007/0118507 A1 | 5/2007 | Bruner |
| 2007/0255576 A1* | 11/2007 | Patterson .................. 705/1 |
| 2007/0269787 A1 | 11/2007 | Constrom |
| 2008/0133601 A1 | 6/2008 | Cervera et al. |
| 2008/0139112 A1 | 6/2008 | Sampath et al. |
| 2008/0215490 A1 | 9/2008 | Howard et al. |
| 2009/0144538 A1* | 6/2009 | Duda .................. G06F 8/65 |
| | | 713/2 |
| 2009/0163183 A1 | 6/2009 | O'Donoghue et al. |
| 2009/0319848 A1 | 12/2009 | Thaper |
| 2010/0088696 A1 | 4/2010 | Stoev et al. |
| 2010/0165938 A1* | 7/2010 | Kuhn .................. G06Q 20/367 |
| | | 370/329 |
| 2010/0169153 A1 | 7/2010 | Hwacinski et al. |
| 2010/0233996 A1* | 9/2010 | Herz et al. .................. 455/411 |
| 2010/0241507 A1 | 9/2010 | Quinn |
| 2010/0280892 A1 | 11/2010 | Uzunalioglu et al. |
| 2011/0125783 A1 | 5/2011 | Whale et al. |
| 2011/0185354 A1* | 7/2011 | Tanner et al. ................ 717/178 |
| 2011/0199322 A1 | 8/2011 | Langlois et al. |
| 2011/0238608 A1 | 9/2011 | Sathish |
| 2011/0250872 A1 | 10/2011 | Kim et al. |
| 2011/0307354 A1 | 12/2011 | Erman et al. |
| 2012/0064820 A1 | 3/2012 | Bemmel |
| 2012/0077470 A1 | 3/2012 | Kim et al. |
| 2012/0102477 A1 | 4/2012 | Kim et al. |
| 2012/0110565 A1 | 5/2012 | O'Sullivan et al. |
| 2012/0123865 A1 | 5/2012 | Salzano |
| 2012/0129496 A1 | 5/2012 | Park et al. |
| 2012/0144384 A1 | 6/2012 | Baek |
| 2012/0246302 A1 | 9/2012 | Lafleur et al. |
| 2012/0290584 A1 | 11/2012 | De Bona et al. |
| 2012/0324052 A1 | 12/2012 | Paleja et al. |
| 2012/0331137 A1 | 12/2012 | Olsen et al. |
| 2013/0047123 A1 | 2/2013 | May et al. |
| 2013/0085851 A1 | 4/2013 | Pedro et al. |
| 2013/0139163 A1 | 5/2013 | Nagasaka et al. |
| 2013/0157637 A1 | 6/2013 | Bos |
| 2013/0167143 A1 | 6/2013 | Yi |
| 2013/0262846 A1* | 10/2013 | Peterson .................. G06F 8/63 |
| | | 713/1 |
| 2013/0263018 A1 | 10/2013 | Kiong et al. |
| 2013/0278710 A1 | 10/2013 | Mock |
| 2013/0317910 A1 | 11/2013 | Mohamed |
| 2013/0346194 A1 | 12/2013 | Adderton |
| 2013/0346840 A1 | 12/2013 | Adderton |
| 2013/0346919 A1 | 12/2013 | Adderton |
| 2014/0089967 A1 | 3/2014 | Mandalia et al. |
| 2014/0173590 A1 | 6/2014 | Ein-Gal et al. |

OTHER PUBLICATIONS

Office Action issued in U.S. Appl. No. 13/654,386 dated Jul. 14, 2014.

Office Action issued in U.S. Appl. No. 13/654,386 dated May 14, 2015.

Office Action issued in U.S. Appl. No. 13/654,389 dated Apr. 8, 2014.

Office Action issued in U.S. Appl. No. 13/654,395 dated Jan. 7, 2015.

Office Action issued in U.S. Appl. No. 13/654,395 dated Oct. 5, 2015.

Office Action issued in U.S. Appl. No. 13/841,140 dated Dec. 10, 2015.

Office Action issued in copending U.S. Appl. No. 13/841,140, dated Sep. 5, 2014, 13 pages.

Final Office Action issued in copending U.S. Appl. No. 13/841,140, dated Mar. 31, 2015, 17 pages.

Office Action issued in U.S. Appl. No. 13/654,386 dated Mar. 24, 2016.

Office Action issued in U.S. Appl. No. 13/841,140 dated Jun. 2, 2016.

International Preliminary Report on Patentability Dated Jun. 23, 2015 From the International Bureau of WIPO Re. Application No. PCT/US2013/076306. (5 Pages).

Applicant-Initiated Interview Summary Dated Jan. 18, 2017 From the US Patent and Trademark Office Re. U.S. Appl. No. 13/841,140. (3 Pages).

Official Action Dated Sep. 2, 2015 From the US Patent and Trademark Office Re. U.S. Appl. No. 13/654,395. (14 Pages).

Official Action Dated Oct. 3, 2016 From the US Patent and Trademark Office Re. U.S. Appl. No. 13/841,140. (14 Pages).

Advisory Action Before the Filing of an Appeal Brief Dated Jul. 10, 2017 From the US Patent and Trademark Office Re. U.S. Appl. No. 13/841,140.

Applicant-Initiated Interview Summary Dated Jun. 13, 2017 From the US Patent and Trademark Office Re. U.S. Appl. No. 13/841,140. (3 Pages).

Official Action Dated May 10, 2017 From the US Patent and Trademark Office Re. U.S. Appl. No. 13/841,140. (20 pages).

\* cited by examiner

LOGIA MOBILE Welcome, Demo
We Monetize Mobile

Upload   Manage   Reports   Log Out

Manage Application

| Application Name | Application Version | App Status | Create shortcut | Network Type | Max installs | Download Period | |
|---|---|---|---|---|---|---|---|
| App — Item Name | 4.1 | ○ Active ⦿ suspended | ○ Yes ⦿ No | ○ WiFi ⦿ 3G ○ Both | 1,000,000 | 01/08/2012  end date | EDIT  DELETE |
| App — Item Name | 4.1 | ○ Active ⦿ suspended | ○ Yes ⦿ No | ○ WiFi ⦿ 3G ○ Both | 1,000,000 | 01/08/2012  end date | EDIT  DELETE |
| App — Item Name | 4.1 | ○ Active ⦿ suspended | ○ Yes ⦿ No | ○ WiFi ⦿ 3G ○ Both | 1,000,000 | 01/08/2012  end date | EDIT  DELETE |
| App — Item Name | 4.1 | ○ Active ⦿ suspended | ○ Yes ⦿ No | ○ WiFi ⦿ 3G ○ Both | 1,000,000 | 01/08/2012  end date | EDIT  DELETE |

LOGIA GROUP
We Monetize Mobile

Contact Us

FIG.5

LOGIA MOBILE Welcome, Demo
We Monetize Mobile

Upload    Manage    Reports    Log Out

Installation Report

☑ Show only active items

○ Quick access  | Today | Yesterday | 7 Days | This Month |

⦿ By date  start date 📅  end date 📅

GENERATE

Export to Excel 📊

| Application Name | Max installation | Start Date | Success | Failed | Unique Users | CurrentStatus |

LOGIA GROUP
We Monetize Mobile

Contact Us

FIG.6

SYSTEM AND METHOD FOR PROVIDING APPLICATION PROGRAMS TO DEVICES

CROSS-REFERENCE TO RELATED APPLICATIONS

This application claims the benefit of U.S. Provisional Application No. 61/738,992, entitled "SYSTEM AND METHOD FOR PROVIDING APPLICATION PROGRAMS TO DEVICES," filed Dec. 18, 2012, and is a continuation-in-part of U.S. application Ser. No. 13/841,140, filed Mar. 15, 2013, the contents of both of which are incorporated by reference as if fully set forth herein.

FIELD OF THE INVENTION

The present preferred embodiments relate to application programs for computing devices, and more particularly, to a method and system for providing application programs to devices.

BACKGROUND OF THE INVENTION

Computing devices, such as handheld smartphones and tablets, are typically delivered to an end-user with certain consumer application programs installed. Many of the applications are basic utilities that provide some basic handheld functionality for a device. For example, on a mobile smartphone device, a mobile telephone interface, contacts database and interface, calendar, music player application, camera application, maps and navigation application, SMS and MMS application, and electronic mail application are pre-installed by the manufacturer. Apart from such basic utilities, mobile network operators (MNO) may have pre-installed trial or full versions of applications for the device that they wish to promote, for example, games, business tools, and other various applications.

Pre-installing applications for devices before they are delivered to the end-user provides the disadvantage of installing applications that new device owner does not desire, and may irritate and displease the owner. An application publisher may also miss the window of opportunity to pre-install applications on a device.

It is desirable to have a system for providing applications to a device while overcoming such disadvantages.

BRIEF SUMMARY OF PREFERRED EMBODIMENTS OF THE INVENTION

A preferred embodiment includes a system and method for providing applications to a computer device. The system receives a request for installation of application programs on the device, where installation includes simulating a pre-installation experience when the installations occur as part of the device's first initialization. The system determines which application programs are available for installation based on a set of installation programs, including parameters which indicate that the applications are part of a publisher's current promotion. The system provides an identification of the set of application programs to the device at the time of first device initialization, from which a user may select for completing the installation. The system receives the installation requests from the user's selections, and sends the installation data for the application programs to the device.

BRIEF DESCRIPTION OF THE DRAWINGS

Preferred embodiments of the present invention are illustrated by way of example, and not by way of limitation, in the figures of the accompanying drawings and in which like reference numerals refer to similar elements and in which:

FIG. 5 illustrates an example of a view of an interface of a management platform for managing the parameters of more than one application in within a view, according to some embodiments.

FIG. 6 illustrates an example of an view of an interface of a management platform for providing reports for application providers to monitor installations, according to some embodiments.

DETAILED DESCRIPTION OF PREFERRED EMBODIMENTS

In the following description numerous specific details have been set forth to provide a more thorough understanding of embodiments of the present invention. It will be appreciated however, by one skilled in the art, that embodiments may be practiced without such specific details or with different implementations for such details. Additionally some well known structures have not been shown in detail to avoid unnecessarily obscuring the present embodiments.

Other and further features and advantages of the present embodiments will be apparent from the following descriptions of the various embodiments when read in conjunction with the accompanying drawings. It will be understood by one of ordinary skill in the art that the following embodiments and illustrations are provided for illustrative and exemplary purposes only, and that numerous combinations of the elements of the various embodiments of the present invention are possible. Further, certain block diagrams are not to scale and are provided to show structures in an illustrative manner. Exemplary systems and processes according to preferred embodiments are described with reference to the accompanying figures, beginning with FIG. 1.

A system and method are described for providing applications to a device by an installation system that allows a varied and selectable set of applications to be installed on the device at the time of device initialization. The system and method provides the user with the experience of having a latest set of default applications on the device at first start-up, as if they were pre-installed on the device's read-only memory (ROM) before distribution.

Figure 1:
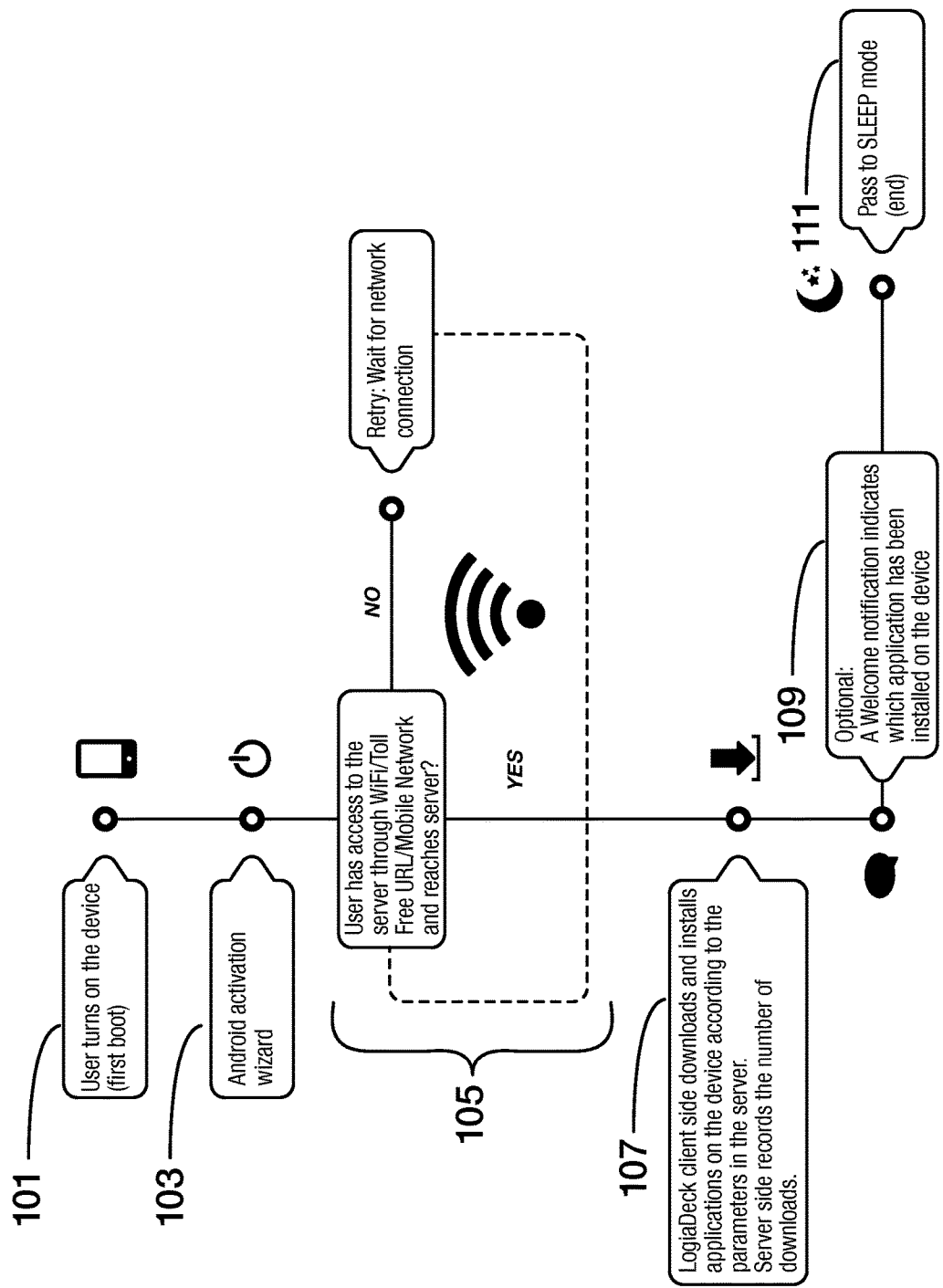
FIG. 1 illustrates a flow of operations for the installation system according to some embodiments.

FIG. 1 illustrates a flow of operations for the installation system according to some embodiments. At the initialization of the device at stage 101, a client pre-installed on a device that is part of the installation system automatically launches at stage 103. A network connection is established at stage 105. At run-time, the client communicates with an applications management server that manages the application programs intended for first installation on the devices managed. The server determines and selects the application programs to offer to the device. At stage 107, the installation system may be configured to proceed with the installation according to the parameters of the server, or it may offer some or all the applications programs for user selection via the client interface. These features enables application programs to be installed in a silent manner, or with the user's express permission. In conjunction with the downloading and installation, the server side records the download to count an aggregate number of downloads of the application from the system. At stage 109, the client optionally presents a Welcome notification indicating which application has been installed on the device.

The server receives a selection from the client interface for applications to download from among the offered applications. In some embodiments, the client interface allows a user to select the manner and method for downloading the selected applications, including whether to only download the application when the device is connected by a WiFi connection. The information is received by the server to be included for consideration among the parameter values for the application.

In some embodiments, installations may be transparent to the end user, running in the background, or approved by the user to be downloaded. The applications will be downloaded free of cost by using either WiFi or zero-rated URL. All applications can be removed/uninstalled by the user.

The client side downloads and installs the applications on the device according to the parameters in the server. A failed installation may be retried until successful installation occurs. The server side maintains a record of the data associated with the download operation, including the identity of the user, the identity of the device, the device type. The data is aggregated among all managed devices.

Update services for installed applications are available from the installation system, or from another applications provider which may provide the same application. Updates to the installation system client are also provided by the installation system.

The application programs are provided to the server by application providers, including one or more application publishers, or by an MNO. In some embodiments, the provider may be given fine control of when and how their application is offered by the server, including aspects such as limiting the number of times the application is offered to users, such as for a promotional free download of the product, or a date range for the offering. The provider may also change the application programs, or a bundle of application programs, being provided at any time. Different bundles may be offered to different devices. Such changes to the applications being offered allows for a dynamic real-time installation process for devices, allowing an up-to-the-minute window of opportunity to provide an application for the installation process. The control functions are provided to the application provider by a remote interface, for example, a web application or web browser interface.

According to some embodiments, a provider may target applications to specific users or user segments that are defined by particular attributes. User segments may be based on demographic data, including but not limited to age, gender, ethnicity, language, income, and geographic location based on an address or area code. User segments may also be based on user's behavioral data, including purchase history for apps and devices, call history, device usage data, and device location data gathered from global positioning system or cellular tower identifiers. Demographic data may be collected from users upon first establishing a service account with an MNO, and behavioral data may be available for users who have an account history with the MNO.

Different attributes may be used together to define a user segment. For example, a user segment may be defined as users who are male, aged 18-34, of moderate income, and who have purchased at least 3 games in the past 6 months are identified as a user segment. Other user segments may include segments of international or domestic business travelers, segments of male or female parents of school-aged children, fashion preference segments, cuisine preference segments, and entertainment preference segments. Geographically based segments allow providers to provide applications of limited geographic relevance to users within a targeted region. For examples, a New York user segment allows New-York-centric applications to be provided to New York users.

In some embodiments, an application provider who is an MNO does not need to provide to the server direct access to the MNO's user accounts or user profile database. Instead, a set of user devices, as identified by their international mobile station equipment identity (IMEI), may be associated with a user segment identifier. A user segment may also be associated with a user account as identified by a user's SIM card (international mobile subscriber identity (IMSI)), or mobile device telephone number (MDN), independent of any particular device.

In some embodiments, an application provider provides the system with lists that associate certain IMEIs, IMEIs, or MDNs with certain user segment identifiers. In some embodiments, an application's installation parameters include one or more user segment identifiers. Upon notification of a device initiation or other installation-triggering event, the system determines a device's or a user's user segment identifier, compares the device's or the user's user segment identifier with an application's user segment identifiers, and provides the application to the user device if a match is found between user segment identifiers. Alternatively, in some embodiments, upon the start of a new promotion campaign, an application may be offered by the system to any previously initiated device associated with the targeted user segment. In still other embodiments, an application may simply be associated with a list of IMEIs, IMSIs, or MDNs that are pre-determined by a provider, and the application is distributed to each user device on the list upon notification of a device initiation or other installation-triggering event, without disclosing to the server the basis for the list. This implementation allows for a provider to maintain segment definitions as trade secrets.

Alternatively, in some embodiments, the system may directly access the MNO's user database through an application programming interface (API) to determine a set of users belonging to a certain user segment according to the segment's definition. Direct access to a user database allows the system to use the most updated data when promoting applications to certain user segments. For example, a system may provide a customized selection of applications to even a new user upon first device initiation by directly accessing an MNO's database to retrieve the user's basic data collected upon first account set-up or first device purchase, such as date of birth, city, gender, pre-paid or subscriber plan.

User segmentation provides MNOs with the advantage of customizing the user's out-of-box experience to the user's anticipated desires and needs by leveraging user data that the MNOs have previously collected from the user. Instead of a new device being loaded with applications that are stale and without direct appeal to the user, user segmentation and dynamic installation upon first device initialization will provide a user with "pre-loaded" applications that are tailored to the user.

While the examples discussed herein include providing applications for automated installation on user devices, it is understood by those skilled in the art that other installations, such as access point name (APN) settings and other mobile device settings, may be provided by the system to devices using the techniques described herein.

Figure 2:
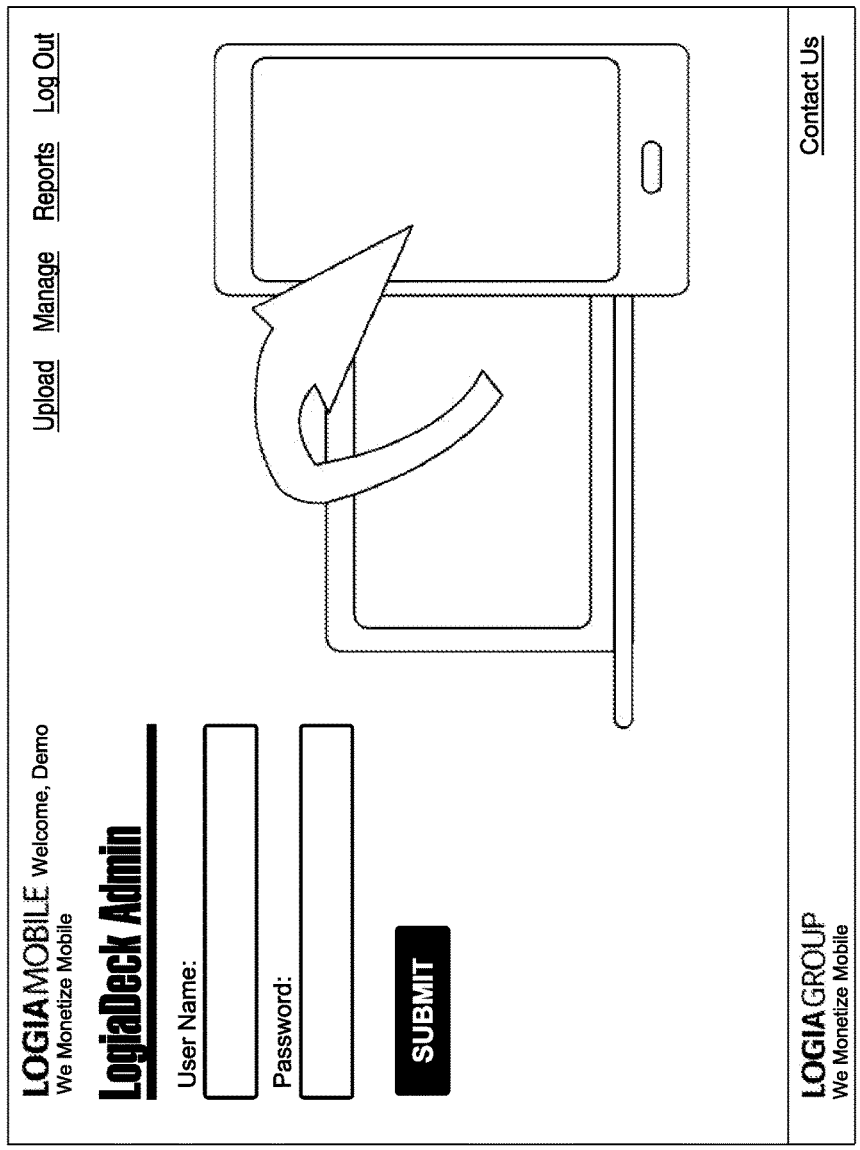
FIG. 2 illustrates an example of an interface of a management platform, according to some embodiments.
Figure 3:
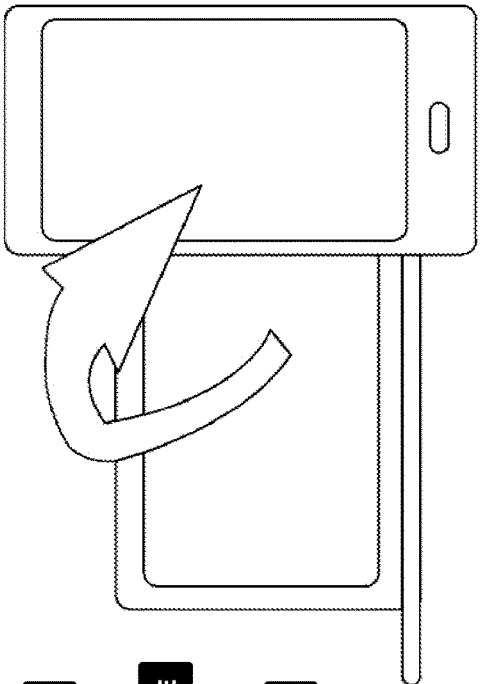
FIG. 3 illustrates an example of a view of an uploading interface of a management platform, according to some embodiments.

Application providers are provided a management interface, as shown in FIG. 2, for managing the applications on the server. Management operations include providing an interface for uploading an application program, and its associated parameters, to the platform, as shown in FIG. 3. The interface allows input of the application name, browsing to the APK file for uploading, or a direct URL link to the APK file.

Figure 4:
FIG. 4 illustrates an example of a view of an interface of a management platform for setting parameters for an application program, according to some embodiments.

FIG. 4 is an example of an interface in the management system for an application provider to set parameters for an uploaded application program. In this example, parameters available for setting include:

Application Name, Application Version, and Application Package Name—these details may be extracted from the APK file for the application program, and in some cases, cannot be changed;

App Status—for setting Active or Inactive, where Active causes the application program to become available for installing on devices;

Create a shortcut in home page—determines if the application program will be presented at the home screen;

Network type—for setting availability by network type, such as from WiFi, 3G, or both;

Maximum installations allowed—for limiting a total number of devices installing the application program by the installation system; and Download period—for setting the period when the application program is available for downloading from the installation system.

FIG. 5 includes an example of an interface for managing the parameters of more than one application within a view.

In some embodiments, the process is repeated after the initialization of the client device to offer applications through the client interface at a later time, including for example after a factory reset when the client device is returned to a state of pre-initialization. In some embodiments, the client interface includes a pop-up overlay, or may provide a notification on the devices, to alert the user of an offer for an application at a later time after device initialization. The system may also check if the application was also already installed on the device from another application provider, and will not duplicate any installations.

FIG. 6 is an example of an interface for providing reports for application providers to monitor installations, according to some embodiments. Management operations include full management analysis and reporting, full control on cost-per-action (CPA) deals and aggregate quantities, number of installations per application or per campaign, and information about the device (IMEI) or the user, for example, as tracked by user account or SIM card (IMSI), including which applications were successfully installed, which applications failed to install, which applications were rejected, when they were installed, and the device type.

Client devices on which the client installation program may be installed includes mobile computing devices running mobile operating systems (i.e., Android, Google Chrome OS, iOS, Windows Mobile and BlackBerry OS), and personal computer devices running operating systems such as Microsoft Windows and OS X.

Figure 7:
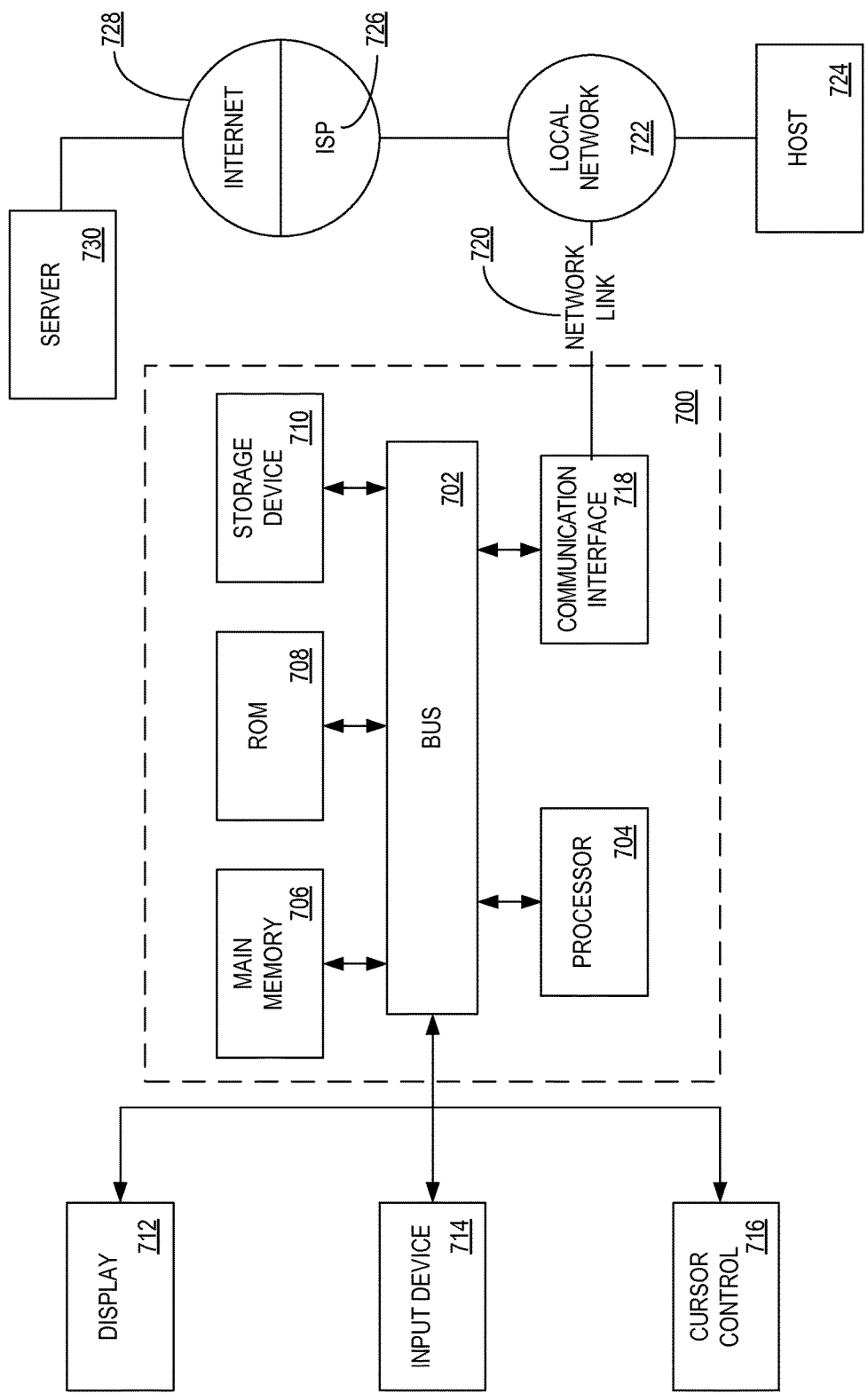
FIG. 7 illustrates an example of a computer system on which some embodiments of the invention may be implemented.

FIG. 7 is a block diagram that illustrates a computer system 700 upon which some embodiments may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, optical disk, or a flash memory device, is provided and coupled to bus 702 for storing information and instructions.

Computer system 700 may be coupled via bus 702 to a display 712, such as a cathode ray tube (CRT) or liquid crystal display (LCD), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, input device 714 is integrated into display 712, such as a touchscreen display for communication command selection to processor 704. Another type of input device includes a video camera, a depth camera, or a 7D camera. Another type of input device includes a voice command input device, such as a microphone operatively coupled to speech interpretation module for communication command selection to processor 704.

Some embodiments are related to the use of computer system 700 for implementing the techniques described herein. According to some embodiments, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments are not limited to any specific combination of hardware circuitry and software. In further embodiments, multiple computer systems 700 are operatively coupled to implement the embodiments in a distributed system.

The terms "machine-readable medium" as used herein refer to any medium that participates in providing data that causes a machine to operate in a specific fashion. In an embodiment implemented using computer system 700, various machine-readable media are involved, for example, in providing instructions to processor 704 for execution. Such a medium may take many forms, including but not limited to storage media and transmission media. Storage media includes both non-volatile media and volatile media. Non-volatile media includes, for example, optical disks, magnetic disks, or flash memory devices, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, flash memory device, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a data transmission line using a modem. A modem local to computer system 700 can receive the data on the data transmission line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or other interne connection device, or a modem to provide a data communication connection to a corresponding type of data transmission line. As another example, communication interface 718 may be a local area network (LAN) card to provide a data communication connection to a compatible LAN. Wireless network links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the Internet 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Various additions, deletions and modifications are contemplated as being within its scope. The scope of the invention is, therefore, indicated by the appended claims rather than the foregoing description. Further, all changes which may fall within the meaning and range of equivalency of the claims and elements and features thereof are to be embraced within their scope.

What is claimed is:

1. A system for providing applications to a client computing device, the system comprising a server computer adapted to:
   determine an application program for installation on a set of client computing devices at the first boot initialization process of the client computing device in the set of client computing devices, based on a user segment associated with the application program, wherein a provider of the application program provides the system with a list that associates certain user segment identifiers with the application program to identify the user segment,
   obtain, before the first boot initialization of the client computing device, at least one of demographic and behavioral data on users of each of a plurality of client computing devices,
   identify in said plurality of client computing devices, the set of client computing devices associated with the user segment based on such data,
   receive a request from a client computing device upon first boot initialization of a particular client computing device in the set of client computing devices associated with the user segment, and
   send, in response to the request and during said first boot initialization process of said particular client computing device, installation data for the application program for automatic start of installation during said first boot initialization process on the particular client computing device associated with the user segment of the particular client computing device, before end user interaction is enabled;
   wherein said demographic data is collected on users of said plurality of client computing devices at least upon first establishing of a service account, and
   wherein said behavioral data is selected from a group consisting of purchase history of applications and devices, in-applications purchase history, call history and device usage data.

2. The system of claim 1, wherein the client computing device is a mobile computing device.

3. The system of claim 1, wherein identifying a set of client computing devices includes determining the set of client computing devices from a list of client computing devices associated with the user segment.

4. The system of claim 1, wherein identifying a set of client computing devices includes comparing and matching user segment identifiers associated with client computing devices with user segment identifiers associated with the application program.

5. The system of claim 1, wherein identifying a set of client computing devices includes accessing a database storing user data associated with each of the client computing devices, determining one or more user segments for each client computing device based on the user data, and comparing and matching user segment identifiers associated with the client computing devices with user segment identifiers associated with the application program.

6. The system of claim 1, wherein the demographic data is selected from the group including age, gender, ethnicity, language, income, education, occupation, and geographic location.

7. The system of claim 6, wherein the geographic location is based on at least one of an address or area code, Internet Protocol (IP) address, or longitude/latitude.

8. The system of claim 7, wherein the geographic location data is gathered from global positioning system or cellular tower identifiers.

9. The system of claim 1, wherein the behavioral data is collected for users of the set of client computing devices who have an account history.

10. The system of claim 1, wherein determining the application program for installation further comprises determining one or more of maximum downloads allowed by an application provider, date range of offering of application as available for downloading from the application provider, and one or more parameters set by the application provider when a promotion campaign is active for one or more application programs.

11. A system for providing applications to a client computing device, the system comprising a server computer storing instructions, which when executed, cause one or more processors to:
determine an application program for installation on a set of client computing devices at the first boot initialization process of client computing devices included in the set of client computing devices, based on a user segment associated with the application program, wherein the client computing devices are mobile computing devices, wherein a provider of the application program provides the system with a list that associates certain user segment identifiers with the application program to identify the user segment,
obtain, before receiving a notification of first boot initialization of the client computing devices, at least one of demographic data and behavioral data on users of each of a plurality of client computing devices,
identify in said plurality of client computing devices, the set of client computing devices associated with the user segment based on said data,
receive a notification of first device boot initialization of a particular client computing device,
identify when the particular client computing device is in the identified set of client computing devices associated with the user segment, and
send, during said first boot initialization process of said particular client computing device, and in response to receiving the notification of first boot initialization of the particular client computing device associated with the user segment and after identifying when the particular client computing device is in the identified set of client computing devices, installation data for the application program for automatic start of installation during said first boot initialization process on the particular client computing device before end user interaction is enabled;
wherein said demographic data is collected on users of said plurality of client computing devices at least upon first establishing of a service account, and
wherein said behavioral data is selected from a group consisting of purchase history of applications and devices, in-applications purchase history, call history and device usage data.

12. The system of claim 11, wherein identifying the set of client computing devices comprises comparing and matching user segment identifiers associated with client computing devices with user segment identifiers associated with the application program.

13. The system of claim 11, wherein identifying the set of client computing devices comprises accessing a database storing user data associated with each of the client computing devices, determining one or more user segments for each client computing device based on the user data, and comparing and matching user segment identifiers associated with the client computing devices with user segment identifiers associated with the application program.

14. The system of claim 12, wherein the user segment identifiers associated with the client computing devices are selected from the group consisting of an international mobile station equipment identity (IMEI), international mobile subscriber identity (IMSI), mobile device telephone number (MDN), Android advertising identifier (AAID), mobile country code and mobile network code (MCCMNC), and location.

15. A method for providing applications to a client computing device, the method comprising:
determining, by a server, an application program for installation on a set of client computing devices at the first boot initialization process of a client computing device in the set of client computing devices, based on a user segment associated with the application program, wherein a provider of the application program provides the system with a list that associates certain user segment identifiers with the application program to identify the user segment;
obtaining, before the first boot initialization of the client computing device, at least one of demographic data and behavioral data on users of each of a plurality of client computing devices;
identifying in said plurality of client computing devices, the set of client computing devices associated with the user segment based on said data;
receiving a request from a client computing device upon first initialization of a particular client computing device in the set of client computing devices associated with the user segment; and
sending, in response to the request and during said first boot initialization process of said particular client computing device, installation data for the application program for automatic start of installation during said first boot initialization process on the particular client computing device associated with the user segment of the particular client computing device, before end user interaction is enabled;

wherein said demographic data is collected on users of said plurality of client computing devices at least upon first establishing of a service account, and wherein said behavioral data is selected from a group consisting of purchase history of applications and devices, in-applications purchase history, call history and device usage data.

16. The method of claim 15, wherein said client computing device is a mobile computing device.

* * * * *